United States Patent
Kelle et al.

(10) Patent No.: US 9,414,732 B2
(45) Date of Patent: Aug. 16, 2016

(54) HEATABLE HIGH-PRESSURE CLEANING DEVICE

(71) Applicant: Alfred Kärcher GmbH & Co. KG, Winnenden (DE)

(72) Inventors: Stefan Kelle, Heidelberg (DE); Ralph Seitter, Backnang (DE)

(73) Assignee: Alfred Kärcher GmbH & Co. KG, Winnenden (DE)

(*) Notice: Subject to any disclaimer, the term of this patent is extended or adjusted under 35 U.S.C. 154(b) by 224 days.

(21) Appl. No.: 13/968,802

(22) Filed: Aug. 16, 2013

(65) Prior Publication Data

US 2013/0333771 A1  Dec. 19, 2013

Related U.S. Application Data

(63) Continuation of application No. PCT/EP2011/053402, filed on Mar. 7, 2011.

(51) Int. Cl.
| | |
|---|---|
| *B08B 3/02* | (2006.01) |
| *A47L 11/28* | (2006.01) |
| *B67D 7/04* | (2010.01) |
| *G05D 9/00* | (2006.01) |
| *G05D 9/02* | (2006.01) |

(52) U.S. Cl.
CPC .............. *A47L 11/28* (2013.01); *B08B 3/026* (2013.01); *B67D 7/04* (2013.01); *G05D 9/00* (2013.01); *G05D 9/02* (2013.01); *Y10T 137/6416* (2015.04)

(58) Field of Classification Search
CPC .......... B08B 3/026; A47L 11/28; G05D 9/00; G05D 9/02; B67D 7/04
USPC ................................. 137/432, 590; 141/198
See application file for complete search history.

(56) References Cited

U.S. PATENT DOCUMENTS

| | | | | |
|---|---|---|---|---|
| 3,342,207 | A * | 9/1967 | Ross ............................. | 137/448 |
| 3,789,865 | A * | 2/1974 | Borman ........................ | 137/122 |
| 4,986,436 | A | 1/1991 | Bambacigno et al. | |
| 6,455,017 | B1 | 9/2002 | Kasting, Jr. et al. | |
| 6,502,607 | B2 * | 1/2003 | Brown et al. ..................... | 141/1 |
| 7,152,638 | B2 * | 12/2006 | Ganachaud .................. | 141/198 |
| 7,584,766 | B2 * | 9/2009 | David et al. ................... | 137/413 |
| 2004/0046044 | A1 | 3/2004 | Bennett et al. | |
| 2005/0115621 | A1 | 6/2005 | Van Vliet et al. | |
| 2010/0078050 | A1 * | 4/2010 | Bauer et al. .................. | 134/198 |

FOREIGN PATENT DOCUMENTS

DE   10 2008 009 221       8/2009
WO   WO 2008125266  A1 *  10/2008

\* cited by examiner

*Primary Examiner* — Kevin Murphy

(74) *Attorney, Agent, or Firm* — Womble Carlyle Sandridge & Rice, LLP

(57) ABSTRACT

A heatable high-pressure cleaning device (10) is provided with a fuel-operated heat exchanger (19) and a fuel tank (34) which has a tank upper section (38) with a closable filling opening (34) and a tank lower section (36) forming the base (48) of the fuel tank (34). In order to develop the heatable high-pressure cleaning device (10) further in such a manner that it can be produced more inexpensively and have a longer service life, the tank upper section (38) can be connected to the tank lower section (36) in a materially joined manner via a join area (60) and the fuel tank (34) can be fillable with liquid fuel only up to beneath the join area (60) in a horizontal position of use of the high-pressure cleaning device (10).

14 Claims, 3 Drawing Sheets

HEATABLE HIGH-PRESSURE CLEANING DEVICE

CROSS-REFERENCE TO RELATED APPLICATIONS

This application is a continuation of international application number PCT/EP2011/053402, filed on Mar. 7, 2011, which is incorporated herein by reference in its entirety and for all purposes.

BACKGROUND OF THE INVENTION

The invention relates to a heatable high-pressure cleaning device with a fuel-operated heat exchanger and a fuel tank which has a tank upper section with a closable filling opening and a tank lower section which forms the base of the fuel tank.

With the aid of heatable high-pressure cleaning devices, a cleaning fluid, preferably water, can be subjected to pressure by means of a high-pressure pump and subsequently heated by means of a heat exchanger. The heated cleaning fluid can subsequently be directed onto an object to be cleaned. The heat exchanger is normally operated with the aid of liquid fuel, for example heating oil or diesel, and can, for this purpose, have a tubular coil which is heated by a burner and through which the cleaning fluid is conveyed. Heatable high-pressure cleaning devices of this type are known, for example, from DE 10 2008 009 221 A1.

The liquid fuel for operating the heat exchanger is stored in a fuel tank of the high-pressure cleaning device. In many cases, the fuel tank is of a two-part design and comprises a tank lower section and a tank upper section which are connected to one another in a fluid-tight manner. It may, for example, be provided for the tank lower section to be screwed to the tank upper section with a sealing element, in particular a sealing ring, as intermediate layer.

The object of the present invention is to develop a heatable high-pressure cleaning device of the generic type further in such a manner that it can be produced more inexpensively and have a longer service life.

SUMMARY OF THE INVENTION

This object is accomplished in accordance with the invention, in a heatable high-pressure cleaning device of the generic type, in that the tank upper section is connected to the tank lower section in a materially joined manner via a join area and that the fuel tank can be filled with liquid fuel only up to beneath the join area in a horizontal position of use of the high-pressure cleaning device.

The invention includes the concept that the production costs of the high-pressure cleaning device can be reduced in that the tank upper section of the fuel tank is connected to the tank lower section in a materially joined manner. This makes a fluid-tight connection of the two tank sections possible. The materially joined connection can be achieved, for example, by way of soldering, bonding or welding. There is, however, the risk with such a materially joined connection that it will be damaged by the fluid fuel which is stored in the fuel tank. In many cases, the fuel has components which damage the materially joined connection of the two tank sections of the fuel tank and can lead to the join area becoming brittle and the fuel tank leaking in the join area. In order to counteract this risk, the fuel tank of the high-pressure cleaning device according to the invention can be filled with liquid fuel only up to beneath the join area. In the horizontal position of use of the high-pressure cleaning device, the fuel poured into the fuel tank does not, therefore, reach the join area and can also not damage it permanently. The fuel in the fuel tank can contact the join area at best in an inclined position or during transport of the high-pressure cleaning device. In this respect, the contact is, however, only short and does not noticeably impair the join area. A long-term contact, as would be the case with a permanent filling level of the fuel tank up to a level above the join area, is avoided by the high-pressure cleaning device according to the invention. The high-pressure cleaning device according to the invention can, therefore, be produced inexpensively and has, nevertheless, a long service life.

In one preferred development of the invention, the tank upper section is connected to the tank lower section via a weld seam and the fuel tank can be filled with liquid fuel only up to beneath the weld seam in the horizontal position of use of the high-pressure cleaning device. If the high-pressure cleaning device is operated in a horizontal position of use, the liquid fuel cannot reach the weld seam between the tank upper section and the tank lower section even with a fuel tank which is filled completely and so the weld seam cannot be damaged by the liquid fuel.

In order to ensure that the fuel tank can be filled only up to beneath the join area in the horizontal position of use of the high-pressure cleaning device it has, in one advantageous embodiment of the invention, a filling level limiting device. The maximum filling level of the fuel tank in the horizontal position of use of the high-pressure cleaning device can be limited by the filling level limiting device to a filling level height which is less than the distance between the join area and the base of the fuel tank. The maximum height of the filling level is, therefore, lower than the height of the join area relative to the base of the fuel tank. The filling level limiting device ensures that the fuel tank overflows insofar as the user continues to fill fuel into the fuel tank once the maximum filling level has been reached.

The filling level limiting device is, in one advantageous embodiment of the invention, arranged on the underside of the tank upper section facing the base of the fuel tank. During the assembly of the fuel tank, the tank upper section can be placed on the tank lower section. The filling level limiting device takes up a position between the two tank sections, wherein it is favorably arranged on the underside of the tank upper section.

A particularly simple assembly of the high-pressure cleaning device will be achieved in one advantageous embodiment of the invention in that the filling level limiting device is connected to the tank upper section in one piece.

It can, for example, be provided for the filling level limiting device to form a one-piece molded plastic part together with the tank upper section.

In one development of the high-pressure cleaning device according to the invention, which is particularly simple from a constructional point of view, the filling level limiting device comprises a dip tube, wherein the filling opening opens into the dip tube and the dip tube extends within the fuel tank as far as beneath the join area in the horizontal position of use of the high-pressure cleaning device. The lower edge of the dip tube, which faces the base of the fuel tank, therefore takes up a position beneath the join area. The fuel tank can be filled via the filling opening and the dip tube adjoining the filling opening in the interior of the fuel tank. If the liquid level of the fuel poured in reaches the lower edge of the dip tube, the air located outside the dip tube above the lower edge of the dip tube cannot escape from the fuel tank during continued filling of the fuel tank since the fuel tank has no other air outlet opening, apart from the filling opening, via which air located in the fuel tank could flow out. The air located in the fuel tank above the lower edge of the dip tube prevents any further rise in the filling level within the fuel tank. During continued filling, only the dip tube adjoining the filling opening can still be filled, subsequently the fuel tank overflows. The dip tube does, however, reliably prevent the fuel located in the fuel tank from being able to reach the join area between the tank upper section and the tank lower section.

The dip tube is favorably integrally formed on the tank upper section. This simplifies both the production and the assembly of the fuel tank.

In order to facilitate the filling of fuel into the fuel tank, it is of advantage when the filling opening is surrounded by a filler neck outside the fuel tank. This filler neck is, in one advantageous embodiment of the invention, aligned coaxially to the dip tube. It may be provided, in particular, for the outer surfaces of the filler neck and the dip tube to be in alignment with one another so that the dip tube connects seamlessly to the filler neck in the direction of filling.

The fuel tank can be configured particularly inexpensively and in an assembly-friendly manner in that the tank upper section, the filler neck and the dip tube form a one-part molded plastic part.

As already mentioned, the materially joined connection between the tank lower section and the tank upper section is brought about via a join area. In the case of a weld connection, the join area is formed by the weld seam between the tank upper section and the tank lower section. In the case of a bonded connection, the join area is defined by the adhesive layer between the tank lower section and the tank upper section.

It may be provided for the join area to extend between a lower edge of the tank upper section and an upper edge of the tank lower section. In such a configuration, the tank upper section can be placed on the upper edge of the tank lower section with its lower edge.

In one advantageous embodiment of the high-pressure cleaning device according to the invention, the join area extends in a horizontally aligned plane in the horizontal position of use of the high-pressure cleaning device. The horizontal alignment of the join area in the horizontal position of use of the high-pressure cleaning device ensures in a constructionally simple manner that the liquid fuel which is filled into the fuel tank cannot reach and damage the join area at any point.

In one advantageous embodiment, the fuel tank forms at least part of the outer contour of the high-pressure cleaning device. In order to avoid any damage to the join area during any unintentional collision of the high-pressure cleaning device with an obstruction, it is of advantage when the fuel tank, in its outer area forming at least part of the outer contour of the high-pressure cleaning device, bears an elastically deformable impact protection which extends on the outer side of the fuel tank along the join area. As a result of the impact protection arranged on the outer side, the join area is protected against mechanical damage. This results in a further extension of the service life of the high-pressure cleaning device.

The impact protection preferably comprises at least one elastically deformable impact lip which is integrally formed on the tank upper section or the tank lower section.

It is particularly favorable when the impact protection has two elastically deformable impact lips which face one another and form a gap between them at the level of the join area. An upper impact lip can be integrally formed on the tank upper section and a lower impact lip can be integrally formed on the tank lower section. If the high-pressure cleaning device encounters an obstruction in the region of its outer contour which forms the fuel tank, the two elastically deformable impact lips can absorb the impact energy associated with the high-pressure cleaning device impacting on the obstruction. The risk of the join area being impaired during such an impact is, therefore, kept small.

A particularly compact construction of the high-pressure cleaning device according to the invention is achieved in one advantageous embodiment in that the high-pressure cleaning device has a chassis and the fuel tank is integrated into the chassis. In addition to its function of providing the mobile high-pressure cleaning device with the required mechanical stability, the chassis has, in such a configuration, the additional function of forming the fuel tank. For this purpose the chassis defines a cavity which forms the fuel tank and can be filled with liquid fuel.

It is favorable when the chassis has a chassis lower section produced from plastic and a chassis upper section produced from plastic, wherein the chassis lower section is welded to the chassis upper section and wherein the chassis lower section forms the tank lower section of the fuel tank and the chassis upper section the tank upper section of the fuel tank.

The following description of one preferred embodiment of the invention serves to explain the invention in greater detail in conjunction with the drawings.

DETAILED DESCRIPTION OF THE INVENTION

Figure 1:
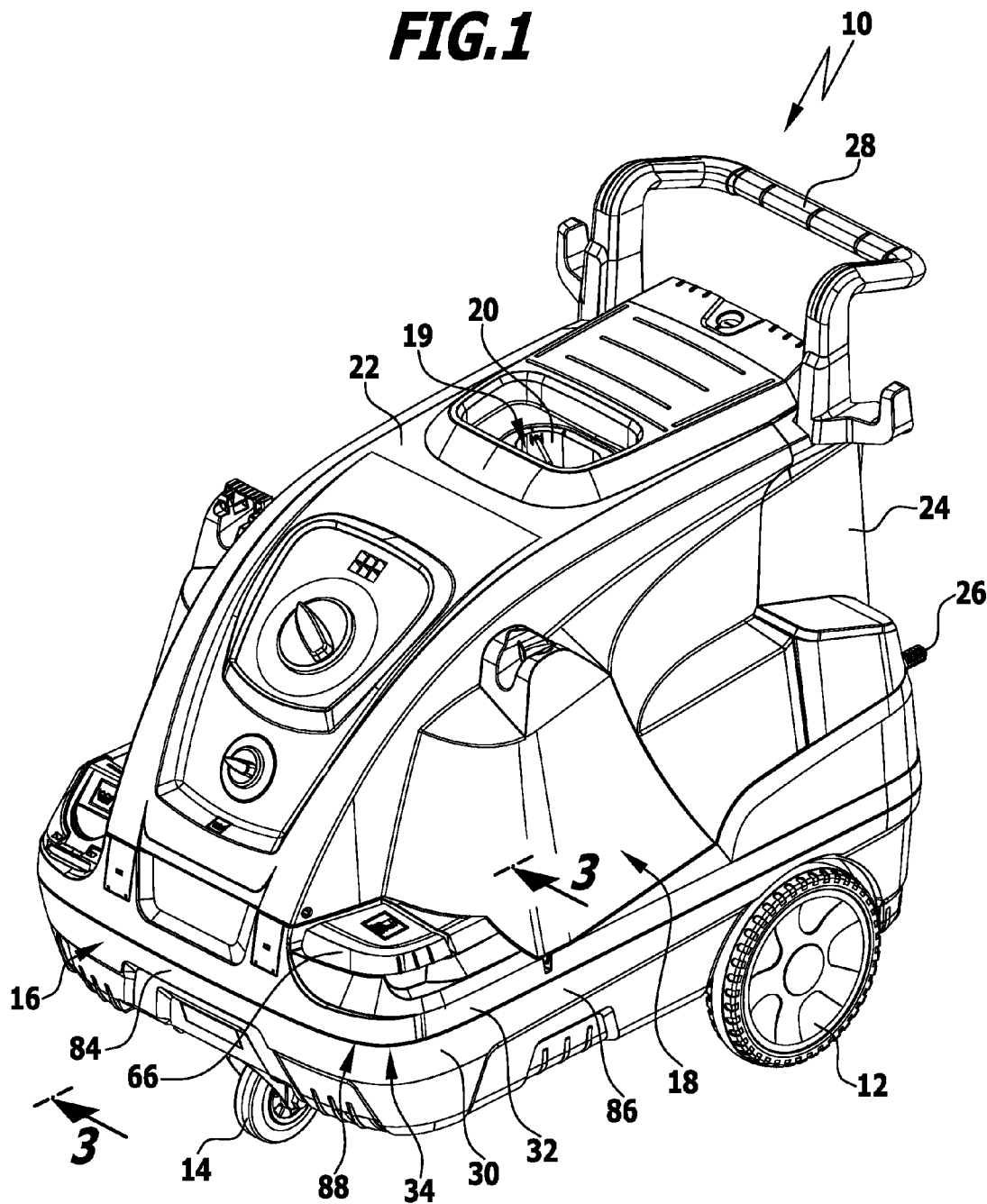
FIG. 1 shows a perspective illustration of a heatable high-pressure cleaning device according to the invention, wherein a filling opening of a fuel tank is closed by a cover.
Figure 2:
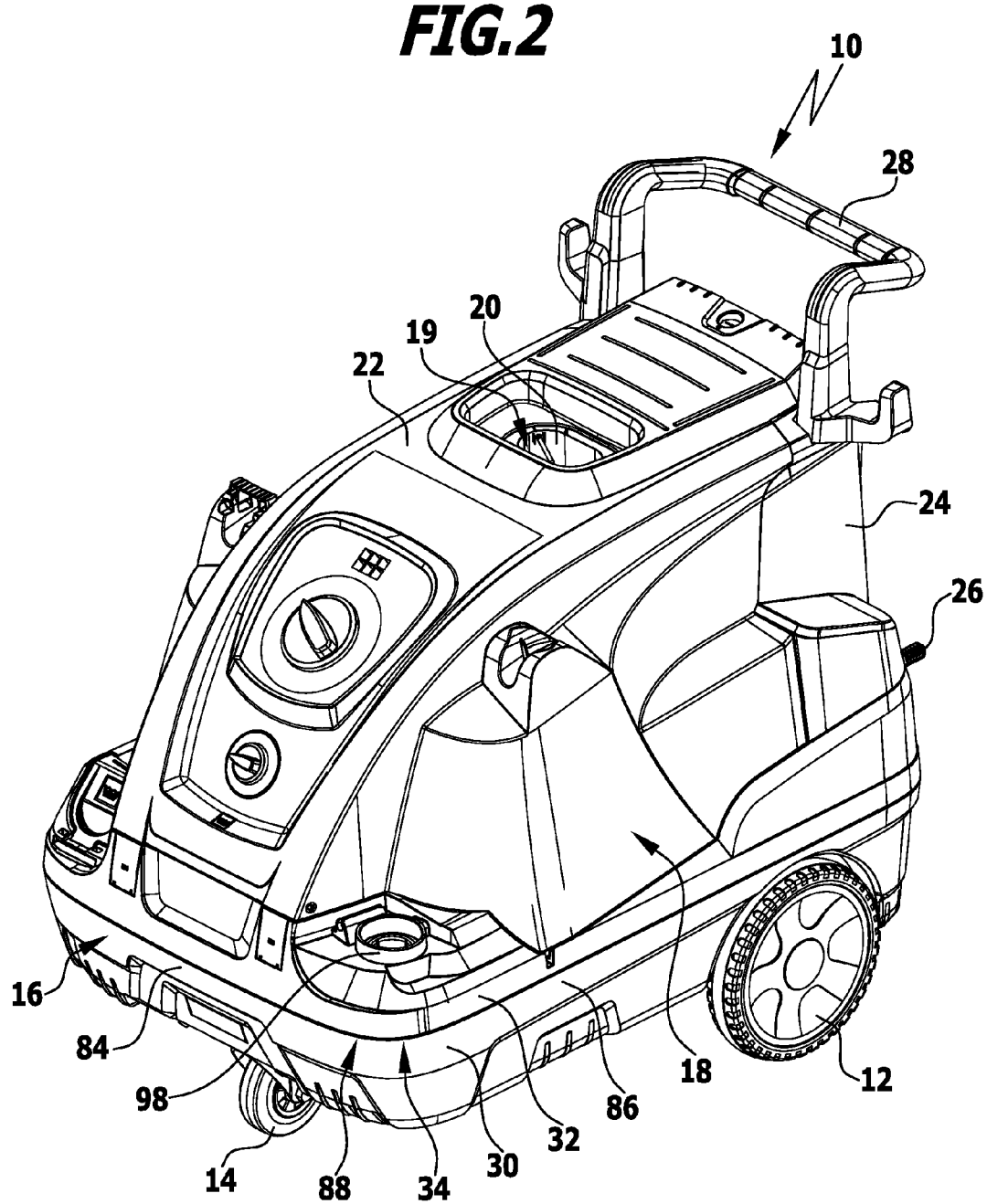
FIG. 2 shows a perspective illustration of the heatable high-pressure cleaning device illustrated in FIG. 1, wherein the cover has been removed from the filling opening of the fuel tank.

A heatable high-pressure cleaning device 10 according to the invention is illustrated schematically in FIGS. 1 and 2, is, in the embodiment illustrated, mobile and has wheels for this purpose, wherein, in the drawings, a rear wheel 12 and a steering wheel 14 are apparent which are mounted on the underside of a chassis 16 so as to be rotatable. A high-pressure pump and an electric motor driving the high-pressure pump are arranged within a housing 18 in a manner known per se and not apparent from the drawings as well as a fuel-operated heat exchanger 19 which is connected to the outlet of the high-pressure pump and the exhaust pipe 20 of which opens into a hood 22 which forms the housing 18 positioned on the chassis 16 together with a base section 24.

The high-pressure pump arranged in the housing 18 can be supplied with a cleaning fluid, in particular water, via a low-pressure inlet which is not illustrated in the drawings, this cleaning fluid being subjected to pressure by the high-pressure pump and heated with the aid of the heat exchanger and, subsequently, being discharged via a high-pressure outlet 26. A high-pressure hose can be arranged at the high-pressure outlet 26 and this bears a spray gun, which is adjoined by a jet pipe, at its free end in a manner known per se. In this way, the cleaning fluid which has been subjected to pressure and heated can be directed onto an object to be cleaned.

The heatable high-pressure cleaning device 10 can, for the purpose of transport, be steered by an operator at a handle 28.

The chassis 16 bears the high-pressure pump as well as its drive motor and also the heat exchanger 19 which are arranged beneath the hood 22. The hood 22 can be pivoted back and forth between a closed position illustrated in FIGS. 1 and 2 and an open position which is not illustrated in the drawings. In the open position, the high-pressure pump, its drive motor as well as the heat exchanger 19 connected in series are accessible to the user.

The chassis 16 is designed in two parts and comprises a chassis lower section 30 produced from plastic and a chassis upper section 32 likewise produced from plastic. A fuel tank 34, which is illustrated schematically in FIG. 3 and in which the liquid fuel required for operating the heat exchanger 19, for example heating oil or diesel, is stored, is integrated into the chassis 16. The fuel tank 34 comprises a tank lower section 36 formed by the chassis lower section 30 and a tank upper section 38 formed by the chassis upper section 32 which are connected to one another in a materially joined and fluid-tight manner. In the embodiment illustrated, the tank lower section 36 and the tank upper section 38 are connected to one another via a weld seam 40. The weld seam 40 forms a join area 60 which extends between a lower edge 42 of the tank upper section 38 and an upper edge 44 of the tank lower section 36. In the horizontal position of use of the high-pressure cleaning device 10, which is illustrated in FIGS. 1 and 2 and in which the high-pressure cleaning device 10 is placed on a horizontal floor space, the weld seam 40, and, therefore, the join area 60, as well, extends in a plane 46 which is of a horizontal alignment.

The tank lower section 36 of the fuel tank 34 is of a trough-like design and comprises a base 48 of the fuel tank 34 as well as a circumferential lower side wall 50 which is connected in one piece to the base wall 48 and extends as far as the upper edge 44 of the tank lower section 36. The tank upper section 38 of the fuel tank 36 forms a ceiling 54 of the fuel tank 34 which is adjoined in one piece by a circumferential upper side wall 56 in the direction towards the tank lower section 34. The upper side wall 56 extends as far as the lower edge 42 of the tank upper section 38. The tank upper section 38 is placed on the upper edge 44 of the tank lower section 36 with its lower edge 42, with the join area 60 inbetween. The join area 60 is formed by the circumferential weld seam 40. The tank lower section 36 is connected to the tank upper section 38 via the weld seam 40 in a materially joined and fluid-tight manner.

Figure 3:
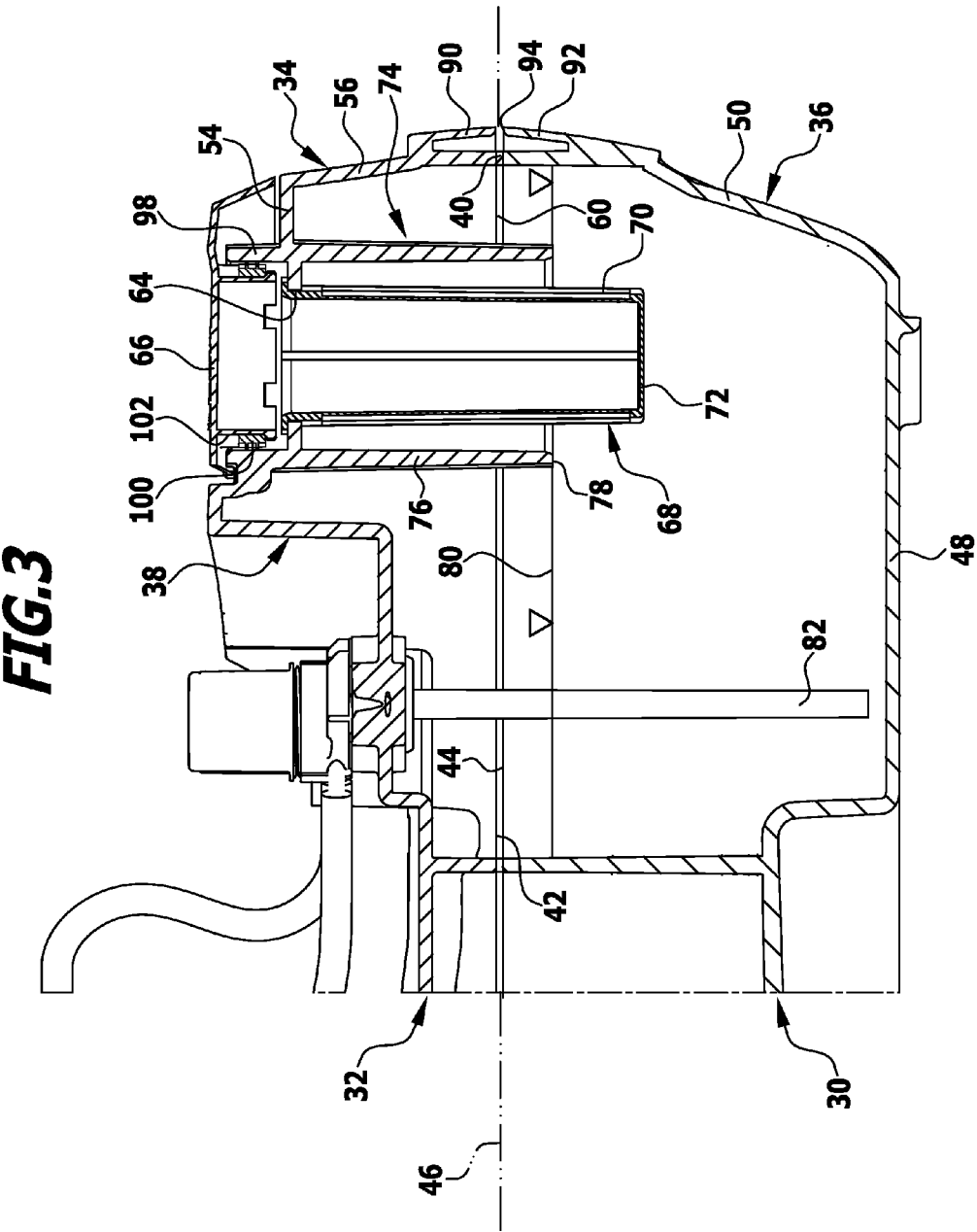
FIG. 3 shows a sectional view of the fuel tank along line 3-3 in FIG. 1.

In the region of the ceiling 54, the tank upper section 38 has a filling opening 64 which can be closed by a cover 66 which is illustrated in FIGS. 1 and 3. A cylindrical filter part 68 is inserted into the filling opening 64 and its outer surface is formed by a filter 70 and its base surface by an end disk 72.

The fuel tank 34 can be filled with liquid fuel via the filling opening 64 and the filter part 68. In order to ensure that the fuel poured in cannot reach the join area 60, i.e., the weld seam 40, in the horizontal position of use of the high-pressure cleaning device 10, the fuel tank 34 has a filling level limiting device 74 which is designed in the embodiment illustrated as a dip tube 76 which is integrally formed on the ceiling 54 of the tank supper section 38 and extends with its lower edge 78 as far as a level beneath the join area 60. The filling opening 64 opens into the dip tube 76 and so liquid fuel can be poured into the fuel tank 34 via the filling opening 64 and the dip tube 76. If the level of liquid 80 reaches the lower edge 78 of the dip tube 76, any further filling with fuel merely leads to the dip tube 76 being filled as far as the filling opening 64 but the fuel poured in cannot reach the join area 60 and, therefore, the weld seam 62 since the air arranged within the fuel tank 34 above the lower edge 78 prevents any further rise in the level of liquid 80. The air above the level of liquid 80 can escape only via the filling opening 64. The fuel tank 34 does have a tank opening, which has a suction tube 82 dipping into the fuel tank 34 passing through it, in a region covered by the hood 22 in its closed position but this tank opening is sealed in a fluid-tight manner so that any exit of air is avoided. The filling level limiting device 74 in the form of the dip tube 76 integrally formed on the tank upper section 38 thus ensures that the maximum filling level of the fuel tank 34 in the horizontal position of use of the high-pressure cleaning device 10 is limited to a height which is less than the distance between the join area 60 and the base 48 of the fuel tank 34.

The dip tube 76 surrounds the filter part 68, which projects beyond the lower edge 78 of the dip tube 76 in the direction towards the base 48, in circumferential direction.

The fuel tank 34 is arranged in the region between an end side 84 and a first longitudinal side 86 of the chassis 16 and defines the outer contour of the chassis 16 in the region of the end side 84 and the first longitudinal side 86. In this region, the fuel tank 34 bears on its outer side at the level of the join area 60 an impact protection 88 which is formed by an elastic, upper impact lip 90 integrally formed on the tank upper section 38 and an elastic, lower impact lip 92 integrally formed on the tank lower section 38. The two impact lips 90 and 92 face one another and define between them a gap 94 which is arranged at the level of the join area 60. If the mobile high-pressure cleaning device 10 encounters an obstruction in the area of transition between the end side 84 and the first longitudinal side 86 of the chassis 16, damage to the join area 60 is prevented by means of the impact protection 88 and, in particular, the occurrence of any leakage in the region of the join area 60.

Above the filling opening 64, the outer side of the ceiling 54 of the tank upper section 38 is adjoined by a filler neck 98 which is designed to be coaxial to and in alignment with the dip tube 76 and to facilitate the pouring of liquid fuel into the fuel tank 34. The filler neck 98 forms a one-piece molded plastic part in combination with the dip tube 76 and the tank upper section 38. The cover 66 can be placed onto the filler neck 98, wherein it dips into the filler neck 98 with an elastically deformable inner collar 100. The inner collar 100 has, above the filler neck 98, several ventilation openings 102, via which air from the surroundings of the high-pressure cleaning device 10 can flow into the fuel tank 34 when fuel is sucked out of the fuel tank 34 in order to counteract the formation of any vacuum within the fuel tank 34.

The fuel tank 34 can be produced and assembled in a simple manner together with the complete chassis 16. Both the chassis upper section 32, which forms the tank upper section 38, and the chassis lower section 30, which forms the tank lower section 36, are produced from a plastic material. During the assembly of the chassis 16, the chassis upper section 32 can be placed on the chassis lower section 30 and, subsequently, the two parts can be welded to one another. Following successful welding, the tank lower section 36 forms the liquid-tight fuel tank 34 in combination with the tank upper section 38. Damage to the weld seam 40 due to any permanent contact with fuel which is filled into the fuel tank 34 will be prevented by means of the filling level limiting device 74 since this ensures that the maximum filling level of the fuel tank 34 merely reaches a level beneath the weld seam 40. This will be ensured in that the lower edge 78 of the dip tube 76 is arranged beneath the weld seam 40 in the horizontal position of use of the high-pressure cleaning device. The high-pressure cleaning device 10 according to the invention can, therefore, be produced inexpensively and has a relatively long service life.

That which is claimed:

1. A heatable high-pressure cleaning device with a fuel-operated heat exchanger and a fuel tank having a tank upper section with a closable filling opening and a tank lower section forming a base of the fuel tank, wherein the tank upper section is connected to the tank lower section in a materially joined manner via a join area and the fuel tank is fillable with liquid fuel only up to beneath the join area in a horizontal position of use of the high-pressure cleaning device;
   wherein the join area extends between a lower edge of the tank upper section and an upper edge of the tank lower section;
   wherein the tank lower section of the fuel tank is of a trough-like design and comprises a base wall of the fuel tank and a circumferential lower side wall which is connected in one piece to the base wall and extends as far as the upper edge of the tank lower section; and
   wherein the tank upper section of the fuel tank forms a ceiling of the fuel tank which is adjoined in one piece by a circumferential upper sidewall in the direction towards the tank lower section, wherein the upper sidewall extends as far as the lower edge of the tank upper section.

2. The heatable high-pressure cleaning device as defined in claim 1, wherein the tank upper section is connected to the tank lower section in a materially joined manner via a weld seam and the fuel tank is fillable with liquid fuel only up to beneath the weld seam in the horizontal position of use of the high-pressure cleaning device.

3. The heatable high-pressure cleaning device as defined in claim 1, wherein the fuel tank comprises a filling level limiting device for limiting the maximum filling level of the fuel tank in the horizontal position of use of the high-pressure cleaning device to a filling level height less than the distance between the join area and the base of the fuel tank.

4. The heatable high-pressure cleaning device as defined in claim 3, wherein the filling level limiting device is arranged on the underside of the tank upper section facing the base of the fuel tank.

5. The heatable high-pressure cleaning device as defined in claim 3, wherein the filling level limiting device is connected to the tank upper section in one piece.

6. The heatable high-pressure cleaning device as defined in claim 3, wherein the filling level limiting device comprises a dip tube, wherein the filling opening opens into the dip tube and the dip tube extends within the fuel tank as far as beneath the join area in the horizontal position of use of the high-pressure cleaning device.

7. The heatable high-pressure cleaning device as defined in claim 6, wherein the dip tube is integrally formed on the tank upper section.

8. The heatable high-pressure cleaning device as defined in claim 6, wherein the filling opening is surrounded outside the fuel tank by a filler neck aligned coaxially to the dip tube.

9. The heatable high-pressure cleaning device as defined in claim 8, wherein the tank upper section, the filler neck and the dip tube form a one-piece molded plastic part.

10. The heatable high-pressure cleaning device as defined in claim 1, wherein the join area extends in a horizontal plane in the horizontal position of use of the high-pressure cleaning device.

11. The heatable high-pressure cleaning device as defined in claim 1, wherein the fuel tank bears an elastically deformable impact protection in an outer area forming at least part of the outer contour of the high-pressure cleaning device, said impact protection extending along the join area.

12. The heatable high-pressure cleaning device as defined in claim 11, wherein the impact protection comprises at least one elastically deformable impact lip integrally formed on the tank upper section or the tank lower section.

13. The heatable high-pressure cleaning device as defined in claim 1, wherein the high-pressure cleaning device has a chassis and the fuel tank is integrated into the chassis.

14. The heatable high-pressure cleaning device as defined in claim 13, wherein the chassis comprises a chassis lower section produced from plastic and a chassis upper section produced from plastic, wherein the chassis lower section is welded to the chassis upper section and wherein the chassis lower section forms the tank lower section and the chassis upper section forms the tank upper section of the fuel tank.

* * * * *